United States Patent [19]

Beaver

[11] Patent Number: 4,721,970
[45] Date of Patent: Jan. 26, 1988

[54] END OF FILM DETECTION DEVICE

[75] Inventor: Richard C. Beaver, Inglewood, Calif.

[73] Assignee: American Electronics, Inc., Fullerton, Calif.

[21] Appl. No.: 881,046

[22] Filed: Jul. 1, 1986

[51] Int. Cl.⁴ ............................................... G03B 1/00
[52] U.S. Cl. .................................. 354/21; 354/173.1; 354/215
[58] Field of Search ............. 354/21, 170, 171, 173.1, 354/173.11, 214, 215, 217, 218, 275; 352/78 R, 78 C, 170, 171, 172

[56] References Cited

U.S. PATENT DOCUMENTS

| | | | |
|---|---|---|---|
| 3,677,627 | 7/1972 | Johnston et al. | 352/92 X |
| 3,753,612 | 8/1973 | Okey et al. | 352/109 |
| 3,811,768 | 5/1974 | Zahn et al. | 352/92 X |
| 4,171,893 | 10/1979 | Kawazoe | 354/173.1 |
| 4,174,888 | 11/1979 | Hunn et al. | 354/217 X |
| 4,176,927 | 12/1979 | Wagensonner | 354/21 |
| 4,299,466 | 11/1981 | Harvey et al. | 354/214 X |
| 4,304,480 | 12/1981 | Fukahori et al. | 354/173.11 |
| 4,311,377 | 1/1982 | Matterson | 354/217 |
| 4,319,812 | 3/1982 | Williams | 352/92 X |
| 4,373,796 | 2/1983 | Matsuura et al. | 354/173.11 |
| 4,385,814 | 5/1983 | Elliott | 352/92 |
| 4,401,376 | 8/1983 | Pomazi | 354/173.1 |
| 4,477,163 | 10/1984 | Matsumoto et al. | 354/214 X |
| 4,552,833 | 11/1985 | Kanaoka et al. | 352/92 X |
| 4,570,876 | 2/1986 | Andoh et al. | 242/188 |
| 4,632,530 | 12/1986 | Iwata et al. | 354/173.11 |
| 4,967,887 | 7/1976 | Suzaki et al. | 352/92 |

FOREIGN PATENT DOCUMENTS 22222  2/1982  Japan ................. 354/173.1

Primary Examiner—W. B. Perkey
Attorney, Agent, or Firm—Charles E. Wills

[57] ABSTRACT

A camera, typically a security camera utilizing film in a cartridge, with means for determining when the film in the cartridge has been exhausted. A radiation emitter with the wavelength of the emitted radiation outside the sensitivity range of the film, a detector for the radiation of the emitter, and a reflecting surface, with the reflecting surface on one side of the film and the emitter and detector on the other side of the film so that presence of film blocks the radiation path from the emitter to the reflecting surface to the detector. A control circuit for controlling camera operation, with the radiation detector output serving to shut off power to the motor when the film supply is exhausted.

15 Claims, 5 Drawing Figures

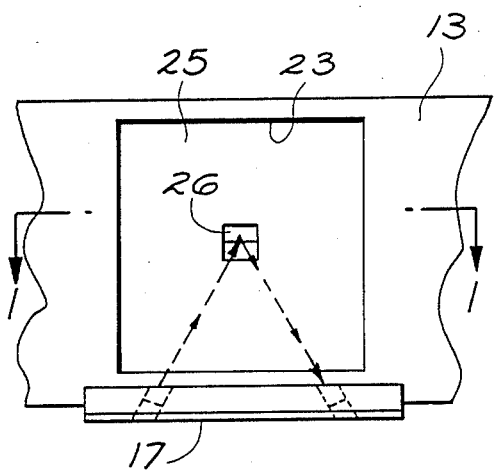
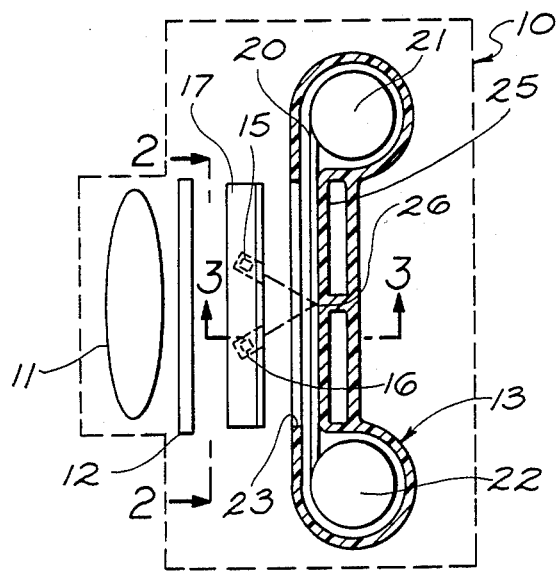

END OF FILM DETECTION DEVICE

BACKGROUND OF THE INVENTION

This invention relates to cameras, and in particular to an apparatus for determining when the supply of film in a camera has been exhausted. The invention will be described herein as utilized in a security camera with the film carried in a cartridge or cassette, but it will be realized that the invention is not limited to this specific end use or film source.

A typical security camera includes a supply of film loaded in a cartridge for easy insertion into and removal from the camera, with the film being advanced by a motor incorporated in the camera. The camera is mounted in a remote location and the motor which both advances the film and actuates the shutter is controlled by an electrical circuit including an alarm switch. The alarm switch may be manually actuated by personnel or may be actuated by intrusion detection devices.

When the film supply in the camera is exhausted, the exposed film needs to be removed and a fresh supply of film installed. It is highly desirable to have an automatic arrangement for indicating when the film supply is exhausted, and for shutting off the power to the motor to stop camera action. A variety of devices for detecting the presence or absence of film, tapes or other strips have been developed. Many of the present devices utilize a light source and a light detector with the light path being directed through sprocket holes or other holes in the film edge. Typical configurations are shown in U.S. Pat. Nos. 4,401,376 to Pomazi and 4,174,888 to Hunn et al. An alternative arrangement utilizes specially coded sections along the film strip, as shown in U.S. Pat. No. 3,967,887 to Suzaki et al.

U.S. Pat. No. 4,373,796 to Matusura et al. utilizes a light source and a light detector positioned on opposite sides of a rotating disk, which disk is driven by the motor which drives the film. While this device provides for shutting off power to the motor when the film supply is used up, it is actually detecting film motor drive action rather than the presence or absence of film.

U.S. Pat. No. 4,391,812 to Williams shows a system with a variety of codes for reading film for projection, including a reflective cue inserted into the margin of the film.

Many of these prior art concepts require special treatment of the film prior to its use. Other of the prior art concepts require access to both sides of the film during use. Hence these prior art configurations are not suitable for use with conventional film cartridges. It is an object of the present invention to provide a new and improved end of film detection device which is readily incorporated into standard camera designs and which can be used with standard film cartridge designs. Other objects, advantages, features and results will more fully appear in the course of the following description.

SUMMARY OF THE INVENTION

A camera having means for moving film along a film path, a reflecting surface, a radiation emitter operating at a wavelength limited to a range which does not cause actinic activity on the film used in the camera, a detector for the radiation of the emitter, and a mounting configuration for supporting the emitter and detector in a radiation path from the emitter to the reflecting surface to the detector, with the reflecting surface on one side of the film path and the emitter and detector on the other side of the film path. An electrical circuit for operating the camera and including a motor for driving film along the film path, an alarm switch for initiating motor operation, and means for stopping motor operation and indicating the end of film, when there is no film in the radiation path. A film cartridge for use in such a camera, with the cartridge providing the film path and the reflecting surface.

BRIEF DESCRIPTION OF THE DRAWINGS

FIG. 1 is a top sectional view diagrammatically illustrating a camera incorporating the presently preferred embodiment of the invention;

FIG. 2 is an enlarged, partial front sectional view, taken along the line 2—2 of FIG. 1, with film being omitted from the film cartridge to show the location of the reflecting surface;

FIG. 3 is an enlarged partial, side sectional view taken along the line 3—3 of FIG. 1, with film being omitted from the film cartridge;

FIG. 4 is a view similar to that of FIG. 1 diagrammatically showing an alternative embodiment of the invention.

DESCRIPTION OF THE PREFERRED EMBODIMENTS

Figure 5:
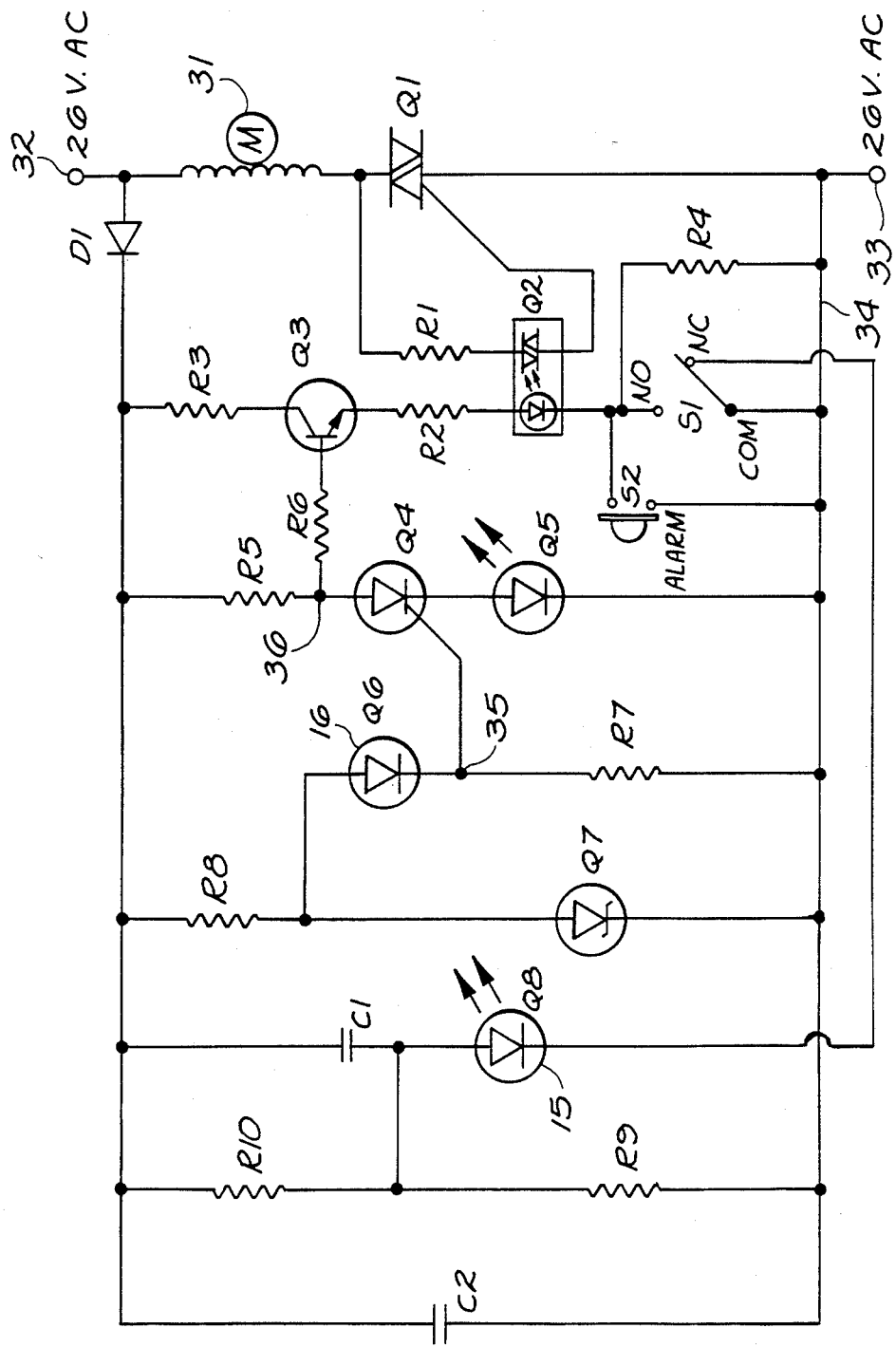
FIG. 5 is an electrical schematic diagram of a circuit suitable for the camera of FIG. 1.

FIGS. 1-3 show a camera 10 with lens 11, shutter 12 and film cartridge 13. The construction and operation of the basic camera may be conventional. An emitter 15 and a detector 16 are mounted in spaced apart relationship within the camera, typically in a support block 17. Typically the emitter and the detector are solid state devices mounted in openings in the block 17, as best seen in FIG. 2, which openings provide collimation for the radiation path. The wavelength of radiation from the emitter is selected to be limited to a range which does not cause actinic activity on the film used in the camera. Typically this is in the infrared range, typically greater than about 900 nanometers. The emitter may comprise a source which emits radiation only in this range, or may comprise a source with a filter for limiting the radiation to the desired wavelength range. The detector is selected to be responsive to the radiation of the emitter.

The film cartridge 13 may be conventional in design and includes a length of film 20 which runs from a supply spool 21 to a take up spool 22, past an exposure opening 23. The cartridge includes a back plane 25 for controlling the position of the film within the camera, with a reflecting surface 26 on the back plane, positioned preferably in about the center of the picture area and at an inclination of about forty-five degrees relative to the back plane. The reflecting surface may be a specially prepared surface or may be a portion of the conventional back plane.

As shown diagrammatically in FIG. 3, the block 17 containing the emitter 15 and the detector 16 is preferably positioned below and in front of the exposure opening 23 so as not to interfere with the image being projected onto the film (not shown) which is in front of the back plane 25 at the exposure opening.

In operation, the film 20 is moved from the spool 21 to the spool 22 along a film path between the reflecting surface 26 on one side and the emitter 15 and detector 16 on the other side. The radiation path from the emitter to the reflecting surface to the detector passes through the film twice. The emulsion of the film is opaque to the radiation from the emitter, so that no radiation is received at the detector. After the last of the film passes the reflecting surface, the radiation path is established from the emitter to the reflecting surface to the detector, and the detector output provides a signal indicating the end of the film.

A presently preferred control circuit for utilizing the invention in controlling the camera as illustrated in FIGS. 1–3 is shown in FIG. 5, with the circuit components identified in Table 1.

TABLE 1

| Resistors | | | Capacitors | |
|---|---|---|---|---|
| R1 | 1 k ohm | ¼ watt | C1 | 0.1 mfd. 50 volt |
| R2 | 1.5 k ohm | ¼ watt | C2 | 250 mfd. 50 volt |
| R3 | 3 k ohm | ¼ watt | | |
| R4 | 100 k ohm | ¼ watt | | Solid State Devices |
| R5 | 1.5 k ohm | 1. watt | | |
| R6 | 10 k ohm | ¼ watt | Q1 | Triac RCA HC 8249 |
| R7 | 5.6 k ohm | ¼ watt | Q2 | Opto Coupler ECG 3047 |
| R8 | 1.5 k ohm | ¼ watt | Q3 | Transistor ECG 123 AP |
| R9 | 4.3 k ohm | ¼ watt | Q4 | SCR ECG 5401 |
| R10 | 10 k ohm | ¼ watt | Q5 | LED Out of Film Indicator |
| | | | Q6 | IR Detector GE PW-36 |
| | Diodes | | Q7 | Zener 30 volt 1 watt |
| | | | Q8 | IR EMITTER GE IN-6264 |
| D1 | Diode IN-4003 | | | |

The camera drive motor 31 is connected in series with the Triac Q1 across the ac supply terminals 32, 33. The Triac Q1 is switched by the output of an optical coupler Q2 which in turn is controlled by the alarm switch S2 through the transistor Q3. The dc power for the circuit is provided by the diode D1 and capacitor C2.

The IR emitter Q8 (15) is energized by a discharge of the capacitor C1 through the switch S1 which connects one terminal of the emitter to circuit ground 34. The switch S1 is actuated when the shutter is reset, thereby pulsing the emitter.

When radiation from the emitter reaches the detector Q6 (16), the detector is switched into conduction and provides a voltage change at junction 35 which triggers the SCR Q4 into conduction. This energizes the LED Q5 which functions as an indicator to provide a visual indication of end of film detection. Conduction by the SCR Q4 also provides a voltage change at the junction 36 which switches the transistor Q3 to control the optical coupler Q2 and shut off power to the motor 31.

Thus the control circuit provides a visual indication of the end of film and also provides control of the operation of the motor. In alternative arrangements, other types of indicators can be used, and the circuit may be used to provide only an indication of end of film or only motor control, as desired.

An alternative configuration is shown in FIG. 4, with components corresponding to those of FIGS. 1–3 indicated by the same reference numerals. In this embodiment, the emitter and detector are separately mounted rather than in a common mounting block, and the film cartridge 13 is omitted.

I claim:

1. In a camera having means for moving film along a film path past an exposure opening, an end of film detection device comprising in combination;
    a reflecting surface within the boundaries of the exposure opening;
    a radiation emitter, with the wavelength of the emitted radiation limited to a range which does not cause actinic activity on the film used in the camera;
    a detector for the radiation of said emitter;
    mounting means carried in the camera for supporting said emitter and detector in a radiation path from said emitter to said reflecting surface to said detector, with said reflecting surface on one side of said film path and said emitter and detector on the other side of said film path;
    indicator means; and
    electrical circuit means connecting the output of said detector to said indicator means in controlling relation for providing an end of film indication when there is no film in said film path between said reflecting surfacse and said emitter and detector.

2. A camera as described in claim 1, wherein said reflecting surface and film are carried in a film cartridge.

3. A camera as described in claim 1, wherein said camera includes a film back plane, with said reflecting surface carried by said back plane.

4. A camera as described in claim 1, wherein said emitter includes an infrared source.

5. A camera as described in claim 1, wherein said emitter provides radiation of a wavelength greater than about 900 nanometers.

6. A camera as described in claim 1, including a motor for moving film along said film path, and
    with said electrical circuit means including means connecting the output of said detector to said motor in controlling relationship for shutting off power to said motor when there is no film in said film path between said reflecting surface and said emitter and detector.

7. A film cartridge for use in a camera having means for moving film along a film path past an exposure opening, a radiation emitter with the wavelength of the emitted radiation limited to a range which does not cause actinic activity on the film in the cartridge, and a detector for the radiation of the emitter, with the emitter and detector providing a radiation path from the emitter to the film cartridge and to the detector, the cartridge including in combination:
    a film back plane; and
    a reflecting surface on said back plane within the exposure opening,
    with said reflecting surface positioned to reflect radiation from said emitter to said detector when there is no film at said film back plane.

8. In a camera having means for moving photographic film along a film path past an exposure opening, an end of film detection device comprising:
    a radiation emitter to the front of the film path, with the wavelength of the emitted radiation being limited to a range which does not cause actinic activity on the film used in the camera;
    a radiation reflector to the rear of the film path within the boundaries of the exposure opening, positioned to receive radiation from said emitter;
    a radiation detector to the front of the film path, positioned to receive reflected radiation from said reflector;
    the emitter and detector being spaced laterally of the film path to not interfere with the projection of an image onto the film at the exposure opening;
    indicator means associated with the detector; and electrical circuit means connecting the output of said detector with said indicator means in controlling relationship for providing an end of film indication when there is no film in the film path between the reflector and the emitter and detector.

9. A camera as described in claim 8, wherein the emitter and the detector are positioned downwardly and forwardly of the exposure opening.

10. A camera as described in claim 9, wherein the reflector is positioned at an angle of about forty-five degrees relative to the plane of the film path.

11. A camera as described in claim 8, wherein the reflector is positioned at about the center of the exposure opening.

12. A camera as described in claim 8, wherein said reflector and film are carried in a film cartridge.

13. A camera as described in claim 12, wherein the film cartridge includes a film back plane and the reflector is carried on said back plane.

14. A camera as described in claim 13, wherein the emitter and the detector are positioned downwardly and forwardly of the film cartridge.

15. A camera as described in claim 14, wherein the reflector is positioned at an angle of about forty-five degrees relative to the film back plane.

* * * * *